United States Patent

[11] 3,591,206

| [72] | Inventors | Paul S. Giovagnoli<br>4200 Birmingham Road, Kansas City, Mo. 64116;<br>Richard F. Smith, Prairie Village, Kans. |
|---|---|---|
| [21] | Appl. No. | 812,460 |
| [22] | Filed | Apr. 1, 1969 |
| [45] | Patented | July 6, 1971 |
| [73] | Assignee | Paul S. Giovagnoli<br>Continuation of application Ser. No. 616,829, Feb. 17, 1967, now abandoned. |

[54] ROTARY WATER DISTRIBUTOR FOR ROTATABLE SPRAY ASSEMBLY
4 Claims, 5 Drawing Figs.

[52] U.S. Cl............................................. 285/98,
285/14, 285/158, 285/370
[51] Int. Cl............................................. F16l 17/00,
F16l 27/00
[50] Field of Search........................................ 137/615;
239/261, 264, 251, 225; 285/98, 370, 134, 136,
190, 272, 275

[56] References Cited
UNITED STATES PATENTS

| 2,695,794 | 11/1954 | Davis et al. | 285/275 X |
|---|---|---|---|
| 3,253,784 | 5/1966 | Long et al. | 239/101 |
| 2,693,373 | 11/1954 | Tremolada | 285/134 |
| 2,751,251 | 6/1956 | Sak et al. | 239/258 |
| 2,805,087 | 9/1957 | Shaw et al. | 285/134 |
| 2,849,244 | 8/1958 | Sampson | 285/190 X |
| 2,867,475 | 1/1959 | Paramonoff | 239/227 |
| 3,129,960 | 4/1964 | Schrodt | 285/134 X |
| 2,327,512 | 8/1943 | Dennis | 239/226 |
| 3,038,667 | 6/1960 | Sandie | 239/257 |
| 3,074,098 | 1/1963 | Downing | 15/314 |
| 3,195,817 | 7/1965 | Sandie | 239/601 |
| FOREIGN PATENTS | | | |
| 1,250,597 | 12/1960 | France | 239/261 |

Primary Examiner—Thomas F. Callaghan
Attorney—Schmidt, Johnson, Hovey, & Williams ABSTRACT: A rotary fluid distributor having a base and a head rotatable on the base. A tubular conduit extends along the axis of rotation of the head and intercommunicates respective passageways in the head and the base so that fluid may be conducted between the base and the head during rotation of the latter. A packing member at each end of the conduit mounts the conduit on the head and the base respectively and is disposed for preventing leakage of fluid from the zone of communication between the respective end of the conduit and the proximal passageway. The packing members are arranged to permit floating movement of the conduit relative to the head and the base to preclude uneven wear of the packing in the event that the head tends to move laterally with respect to the base. Two species of the distributor are disclosed. In the first, the head is rotated mechanically and in the second the head is rotated by the reaction to the streams of fluid leaving the head.

PATENTED JUL 6 1971 3,591,206

INVENTORS.
Paul S. Giovagnoli
Richard F. Smith
BY
Hovey, Schmidt, Johnson & Hovey.
ATTORNEYS.

ROTARY WATER DISTRIBUTOR FOR ROTATABLE SPRAY ASSEMBLY

This application is a continuation of application Ser. No. 616,829 filed Feb. 17, 1967 and now abandoned.

This invention relates generally to improvements in rotary-type fluid-distributing apparatus and, more particularly, to the utilization of novel fluid conveying means therethrough, allowing more efficient use of packing means resulting in minimization of wear, fluid leakage and frictional resistance to rotation.

Rotary spray equipment utilizing rotatable nozzles has been suggested for distribution of water over large surface areas. It has been found that such equipment may have application in the vehicle-washing industry in lieu of the large brushes and the like heretofore required. The films of dirt and grime which build up on the surface of a vehicle during the normal use thereof and particularly when traveling on a wet roadway, become securely bonded thereto upon drying. The removal of such film usually requires vigorous scrubbing activity heretofore supplied by contacting the surface with a brush. It has been discovered that high velocity water streams directed against the surface of the vehicle from points in close proximity thereto produce cleaning results which closely approach, if not exceed, the scrubbing results obtained from brushes.

High velocity water streams are achieved by forcing water from a nozzle at pressures which may be as high as about 1,000 p.s.i. The rotary distributors which have been used in the past have been found to leak profusely around the shaft packing between the rotary components and the stationary components when the distributor is subjected to relatively high internal fluid pressures of the order of those mentioned. This leakage can be reduced in a new distributor of any type by tightly packing the rotatable shaft; however, such packing produces great frictional resistance to rotation. Thus, reduced leakage is achieved only at the expenditure of large quantities of energy. Additionally, misalignment and radial movement of the relatively movable parts of a distributor caused by bearing wear on the supporting components therefor necessarily produce deformation of packings and results in leakage therethrough regardless of the initial tightness of the packing or the type of seal used.

It is, therefore, the primary object of this invention to provide a rotary-type fluid distributor having minimum leakage of water therefrom even after extended periods of usage without incurring excessive resistance to rotation.

As a corollary to the foregoing object, it is an important aim of the invention to provide a rotary distributor wherein an elongated conduit extends between the rotary components and the stationary components and is floatingly mounted with respect to both, whereby any forces or wear factors which can or do cause misalignment of the relatively rotatable components during operation of the distributor have no effect on the ability of the conduit to transmit fluid through the distributor without leakage.

Another very important object of the instant invention is the provision of an elongated conduit extending between the rotatable and stationary components of a rotary distributor wherein the conduit is free to move laterally to a certain degree with respect to the components rotating relative thereto to compensate for structural gaps caused by loose fitting components, whether created by wear or original machining without close tolerances.

Yet another important object of the invention is to provide such a distributor of sturdy construction suitable for withstanding high internal fluid pressures and capable of carrying heavy spray nozzles attached to the rotating head and, at the same time, having minimal leakage and resistance to rotation.

Figure 3:
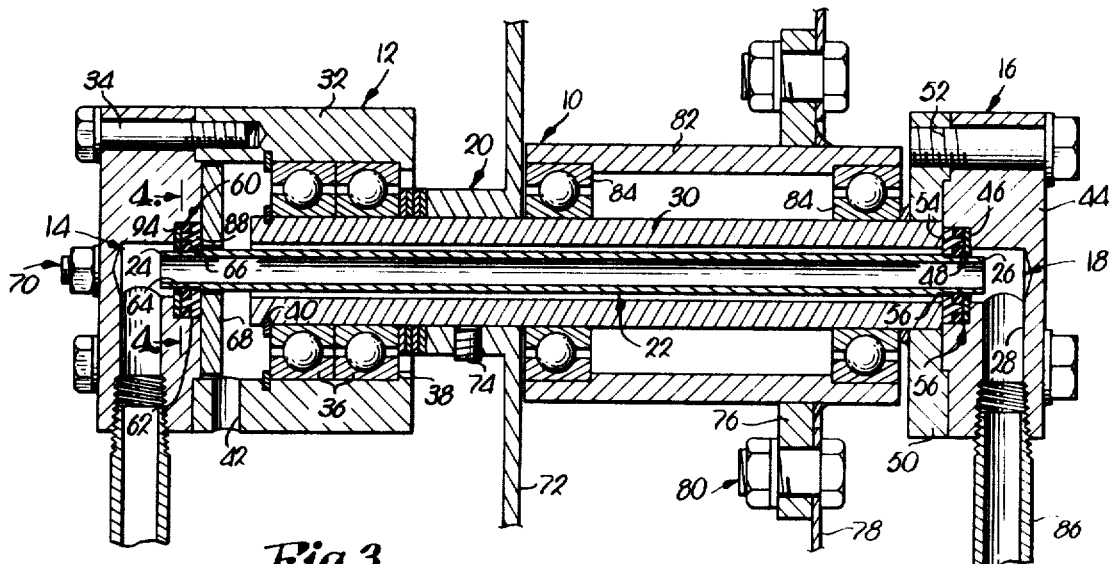
FIG. 3 is a detailed, cross-sectional view taken along line 3-3 of FIG. 2.
Figures 1, 2:
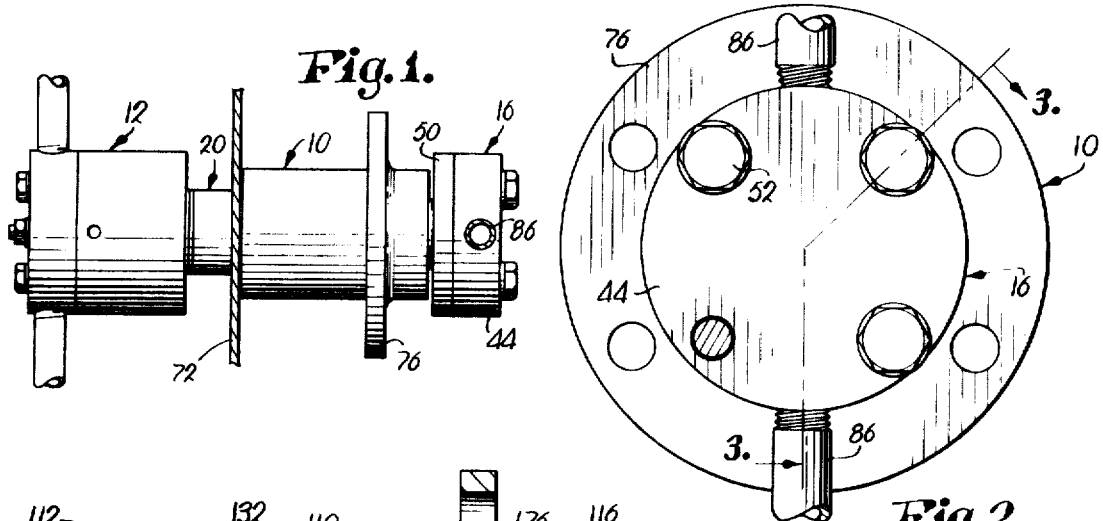
FIG. 1 is a side view of a rotary-type fluid distributor embodying the concepts and principles of the instant invention.
FIG. 2 is an enlarged view looking leftwardly at the distributor illustrated in FIG. 1.

The rotary-type fluid distributor illustrated in FIGS. 1, 2, 3 and 4 embodies the principles and concepts of the instant invention and is broadly designated by the numeral 10. Distributor 10 includes a base element 12 provided with a fluid inlet passageway 14, a head element 16 spaced from base 12 and provided with a fluid outlet passageway 18, structure 20 mounting head 16 on base 12 for rotation of head 16 about an axis extending into passageways 14 and 18, and an elongated conduit 22 extending along the axis of rotation of head 16 with respect to base 12. Conduit 22 has opposed ends 24 and 26 communicating with passageways 14 and 18 respectively, and passageway 18 has a portion 28 extending outwardly from the axis of rotation of head 16 relative to base 12.

Structure 20 includes an elongated, tubular shaft 30 mounted on head 16 for rotation therewith. Shaft 30 is disposed in impaling, spaced relationship with respect to conduit 22 as can be seen viewing FIG. 3. Structure 20 also includes a cylindrical sleeve 32 which is preferably attached to base 12 by a plurality of studs 34. Sleeve 32 rotatably supports shaft 30 through the medium of antifriction means in the nature of a pair of bearing races 36 maintained in position by a shoulder 38 on sleeve 32, and a clip ring 40 in engagement with shaft 30 as can best be seen in FIG. 3.

Sleeve 32 is provided with a vent hole 42. Head 16 includes a main body 44 having a recess 46 therein communicating with passageway 18 and surrounding a portion 48 of conduit 22 adjacent end 26 of the latter. Head 16 also includes an annular plate 50 rigid with shaft 30 and affixed to body 44 by a plurality of studbolts 52. Plate 50 and the end 54 of shaft 30 proximal to body 44 provide clamp means for maintaining an annular packing member 56 within recess 46 and against portion 48 of conduit 22. In this respect, portion 48 has a smaller diameter than the central portion of conduit 22 presenting a shoulder 58 which bears against packing 56.

Similarly, an annular packing member 60 is received within a recess 62 in base 12 surrounding conduit 22 and communicating with passageway 14. Conduit 22 has a portion 64 of reduced diameter adjacent end 24 of conduit 22, presenting a shoulder 66 which bears against packing 60. Packing 60 is maintained within recess 62 by clamp means in the nature of an annular plate 68 firmly connected to base 12 by nut-and-bolt means 70. Together, packing members 56 and 60 present packing means for preventing leakage of fluid from passageways 18 and 14 past conduit 22 and for carrying conduit 22 for floating movement relative to head 15 and base 12.

Distributor 10 includes means for rotating head 16 in the nature of a device 72 attached to shaft 30 through the medium of setscrew 74. Thus, upon rotation of device 72, shaft 30 and thereby head 16, are caused to rotate.

A mounting flange 76 is provided for attaching distributor 10 to a wall 78, preferably by nut-and-bolt means such as 80. Flange 76 extends outwardly from a cylindrical shell 82 disposed in circumscribing relationship with respect to shaft 30. Shaft 30 is spaced from shell 82 and antifriction means in the nature of bearing races 84 are disposed therebetween whereby shaft 30 is rotatably supported by shell 82 and thus by wall 78 through the medium of flange 76.

Pipes such as 86 extend laterally from head 16 and communicate with passageway 18 and include nozzles (not shown) for distributing fluid around the periphery of a circle concentric with the axis of rotation of head 16 relative to base 12.

Figures 4, 5:
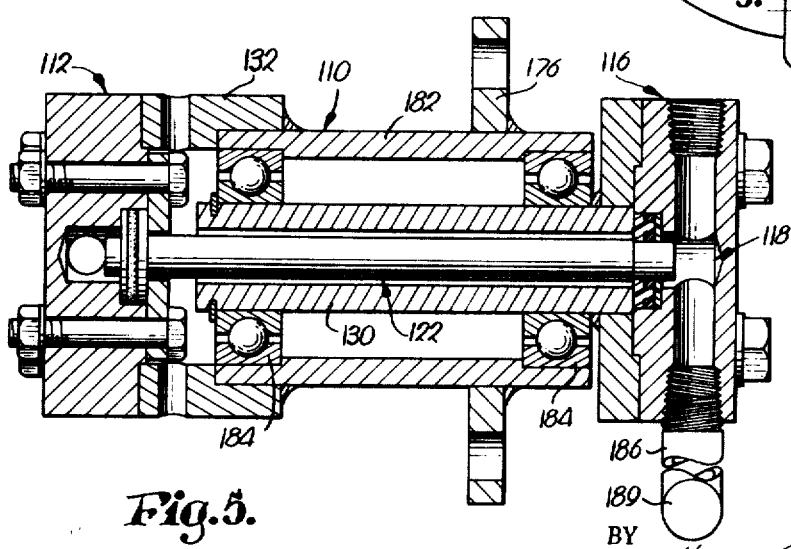
FIG. 4 is a cross-sectional, detailed view taken along line 4-4 of FIG. 3.
FIG. 5 is a side, cross-sectional, detailed view of a rotary fluid distributor illustrating a second embodiment of the concepts and principles of the instant invention.

Viewing FIG. 4, it can be seen that each packing member 56 and 60 comprises a spacer 88 and resilient means in the nature of a pair of concentrically disposed O-rings 90 and 92. Packing member 60 also includes an annular keeper 94 cooperating with spacer 88 to present alignment grooves for rings 90 and 92 as can best be seen in FIG. 3. Thus, packing members 56 and 60 may be handled as units and expeditiously positioned within recesses 46 and 62 respectively.

Referring to FIG. 5, another embodiment of the principles and concepts of the instant invention is presented by a rotary type fluid distributor 110. Many of the components of distributor 110 are similar, if not identical, with the corresponding components of distributor 10, these components having been designated by like numbers in the hundred series.

Distributor 110 is a reaction-type distributor wherein fluid is projected from nozzle 189 at an angle with respect to an imaginary line extending radially with respect to the axis of rotation of head 116 relative to base 112. Thus, nozzle 189, pipe 186, channel 118, and the fluid flowing from conduit 122 present means for rotating head 116 relative to base 112.

It can be seen that distributor 110 has no component corresponding to device 72 for rotating head 116 because distributor 110 is of the reaction type. Thus, conduit 122 is considerably shorter than the corresponding conduit 22 of distributor 10. Furthermore, shell 182 and sleeve 132 are preferably welded together with shell 182 in coaxially spaced relationship with respect to shaft 130. Bearing races 184 are disposed between shaft 130 and shell 182 presenting antifriction means whereby shaft 130 is rotatably mounted on sleeve 132 and shell 182. A flange 176 extends outwardly from shell 182 providing means for mounting distributor 110 on a wall such as 78.

In the operation of distributor 10, head 16 is rotated relative to base 12 through the action of device 72 on shaft 30. Fluid is transmitted through passageway 14, conduit 22, passageway 18 and pipe 86 to a nozzle (not shown). Conduit 22 is rotatable relative to base 12 through the medium of packing member 60. Similarly, conduit 22 is rotatable relative to head 16 through the medium of packing member 56. Furthermore, conduit 22 is free floating relative to base 12 and head 16 through the medium of packing members 56 and 60. Assuming that head 16 is rendered dynamically unbalanced for some reason, a lateral force would be applied on portion 48 through packing member 56. If conduit 22 were rigid with base 12, a wear point would develop. However, because conduit 22 is free floating with respect to packing member 60, it is able to move laterally away from the lateral force applied thereon by the unbalanced rotation of head 16. Specifically, the resiliency of ring 92 permits conduit 22 to swing relative to base 12 in any direction in response to forces applied on portion 48 by head 16 during the rotation of the latter. In this respect, it is important to note that should the packing member at either end of conduit 22 tend to wear, conduit 22 is free to move in a conical or oscillatory path of travel if lateral forces are imparted thereto, thus providing compensation for a loose fitting packing.

Of course, it is to be understood that all of the above components apply equally as well to distributor 110. Distributors 10 and 110 have minimum leakage of water therefrom, even after extended periods of usage, without having incurred excessive resistance to rotation. The novel structure of distributors 10 and 110 provides an assemblage of components wherein loose fits occasioned by machining without close tolerances or wear are compensated for by the inherent functioning of the components. Thus, it can be seen that all of the objects, purposes and aims of the instant invention have been fulfilled in a substantial sense.

Having thus described the invention, what we claim as new and desired to be secured by Letters Patent is:

1. A rotary-type fluid distributor comprising:
   a pair of relatively rotatable elements, each having an elongated fluid passageway therethrough, said passageways being in axial alignment;
   means rotatable joining one of the elements to the other element and including tubular structure extending into opposite-aligned ends of the passageways and spaced bearings on one of the elements supporting said structure for rotation therein;
   an elongated conduit within and spaced from the structure, independent of and movable laterally with respect to the elements, intercommunicating the passageways thereof, and extending substantially along the axis of relative rotation of said elements,
   each of said elements being provided with a recess communicating with the passageway thereof adjacent a respective end of the conduit;
   resilient annular packing means on the elements received within a respective recess in disposition engaging the conduit for preventing leakage of fluid from the passageways past the conduit and carrying the conduit for floating movement relative to both of the elements whereby any relative lateral movement of said elements has minimum effect on the fluid seal provided by said packing means; and
   separate means for clamping each packing means in its recess, said conduit being provided with a portion of reduced diameter adjacent each end thereof presenting a shoulder, said packing means surrounding corresponding reduced diameter portions of the conduit and engaging proximal shoulders.

2. A distributor as set forth in claim 1, wherein said packing members each include a resilient ring circumscribing said conduit and permitting the latter to swing laterally relative thereto.

3. A distributor as set forth in claim 1, wherein is included means operably coupled with said one element for rotating the latter.

4. The invention of claim 3, wherein said rotating means includes a device secured to said one element and adapted to be rotated.